UNITED STATES PATENT OFFICE.

CHARLES A. COE, JR., OF OSHKOSH, WISCONSIN.

VETERINARY REMEDY.

No. 886,946.   Specification of Letters Patent.   Patented May 5, 1908.

Application filed April 12, 1906. Serial No. 311,382.

*To all whom it may concern:*

Be it known that I, CHARLES A. COE, Jr., a citizen of the United States, residing at Oshkosh, in the county of Winnebago and State of Wisconsin, have invented new and useful Veterinary Remedies, of which the following is a specification.

This invention relates to medical compounds, and particularly to compounds to be used as a remedy for fevers in animals.

The invention comprises the mixing of an acid and oleaginous matter and gunpowder.

It further comprises the mixing of an acid (vinegar) and oleaginous matter in a melted condition, the solidifying of the oily matter, and the addition of black gunpowder.

The object in view is the production of a compound composed of an acid, and oily matter, and black gunpowder in such a way as to form distinct layers of the several substances comprising the mixture.

Another object in view is the mixing an acid with oleaginous matter, allowing the oleaginous matter to solidify, and then the placing thereon black gunpowder, the entire mixture being adapted to be intermixed when used as a remedy.

With these and other objects in view the invention comprises the various combination and arrangement of matter for accomplishing various results as hereinafter more fully described and claimed.

In my invention, I first take any suitable acidulous matter, preferably vinegar, and then mix therewith in a melted condition any oleaginous matter, preferably lard, of about equal proportion to the vinegar. The mixture is allowed to cool until the oily matter has become solidified, thus making two distinct layers of matter, viz., lard and vinegar. Then, I place upon the surface of the lard any desirable amount of gunpowder, preferably the black or charcoal gunpowder. I find that good results are obtained from the use of approximately one-half pint of vinegar, one-half pint of lard, and two ounces of gunpowder, these proportions may be changed with good results for the different forms of fevers being treated.

By assembling the ingredients of my compound in the way above indicated, the gunpowder is prevented from mixing with the acid and consequently dissolving in the same.

In preparing my compound for the market, I usually place the same in bottles of convenient size, first by placing the vinegar therein, melting the lard and running the same into the bottle, and after it has become congealed, place the gunpowder on top of the lard.

When it is desired to use the compound, the bottle is taken and placed in warm water and the contents thereof agitated until thoroughly mixed, and then the compound is administered to the animal.

As will be evident, my compound when properly assembled separates itself into three distinct layers. First, the acid, which remains at the bottom of the bottle or receptacle, then the lard, which when congealed rises and remains on the surface of the vinegar, and then the gunpowder rests on top of the same. In this way, I produce a compound that is made up of layers of matters of distinct medical properties, and are so arranged as to not lose any of their respective medical virtues by reason of mixing one with the other before administration.

What I claim is:—

1. The process of packing lard, vinegar and gunpowder, in separate layers, within an imperforate container, consisting in introducing a mixture of vinegar and molten lard into said container, allowing the mixture to stand and cool until the lard forms a congealed layer upon the vinegar and then placing the gunpowder upon the congealed lard.

2. A package comprising lard, vinegar and gunpowder arranged in separate layers within an imperforate container, said vinegar and said gunpowder being separated by said lard.

In testimony whereof I affix my signature, in presence of two subscribing witnesses.

CHARLES A. COE, JR.

Witnesses:
A. R. WATERHOUSE,
WM. B. STICKNEY.